US011914732B2

(12) United States Patent
Drapeau et al.

(10) Patent No.: US 11,914,732 B2
(45) Date of Patent: Feb. 27, 2024

(54) SYSTEMS AND METHODS FOR HARD DELETION OF DATA ACROSS SYSTEMS

(71) Applicant: Stripe, Inc., San Francisco, CA (US)

(72) Inventors: Ryan Drapeau, Seattle, WA (US); Andrew Bullen, Alameda, CA (US)

(73) Assignee: STRIPE, INC., South San Francisco, CA (US)

( * ) Notice: Subject to any disclaimer, the term of this patent is extended or adjusted under 35 U.S.C. 154(b) by 113 days.

(21) Appl. No.: 17/123,694

(22) Filed: Dec. 16, 2020

(65) Prior Publication Data
US 2022/0188439 A1  Jun. 16, 2022

(51) Int. Cl.
| | | |
|---|---|---|
| *G06F 21/00* | (2013.01) | |
| *G06F 21/31* | (2013.01) | |
| *G06F 21/54* | (2013.01) | |
| *G06F 21/62* | (2013.01) | |
| *G06F 21/64* | (2013.01) | |

(52) U.S. Cl.
CPC .......... *G06F 21/6218* (2013.01); *G06F 21/31* (2013.01); *G06F 21/54* (2013.01); *G06F 21/64* (2013.01); *G06F 2221/2141* (2013.01)

(58) Field of Classification Search
CPC .......... G06F 21/31; G06F 21/54; G06F 21/64; G06F 21/6218; G06F 2221/2141
See application file for complete search history.

(56) References Cited

U.S. PATENT DOCUMENTS

| 11,531,666 | B1 * | 12/2022 | Park ....................... G06N 20/00 |
| 2002/0091741 | A1 | 7/2002 | Ferreira et al. |
| 2005/0198037 | A1 | 9/2005 | Berman et al. |
| | | (Continued) | |

FOREIGN PATENT DOCUMENTS

| CN | 107733982 A | * | 2/2018 | ............. H04L 67/10 |
| CN | 111367473 A | * | 7/2020 | ............. G06F 3/067 |
| KR | 1020100034644 A | | 4/2010 | |

OTHER PUBLICATIONS

Kanne, Megan, "Deleting data distributed throughout your microservices architecture," https://blog.twitter.com/engineering/en_us/topics/infrastructure/2020/deleting-data-distributed-throughout-your-microservices-architecture.html, May 4, 2020.

(Continued)

*Primary Examiner* — Joseph P Hirl
*Assistant Examiner* — Chi D Nguy
(74) *Attorney, Agent, or Firm* — Womble Bond Dickinson (US) LLP

(57) ABSTRACT

A method and apparatus for hard deletion of user data are described. The method may include receiving a request from a user computer system to delete user data. The method may also include determining a unique user identifier associated by a system with a user making the request. The method may also include determining whether a data partition, in which data generated by a job or subsystem of the computer system is stored, is predicted to contain a record having the unique user identifier. Then, the method may include searching, when the data partition is predicted to contain a record having the unique user identifier, data records stored in the data partition for a user data record based on the unique identifier, and performing a hard deletion of the user data record from the partition when found during the searching.

18 Claims, 7 Drawing Sheets

(56) References Cited

U.S. PATENT DOCUMENTS

| | | | | |
|---|---|---|---|---|
| 2007/0057099 A1* | 3/2007 | Kubo | .................... | G06Q 50/18 |
| | | | | 241/101.2 |
| 2011/0219106 A1* | 9/2011 | Wright | ................. | G06F 3/0619 |
| | | | | 709/223 |
| 2013/0290437 A1* | 10/2013 | Saib | ...................... | G06Q 50/01 |
| | | | | 707/E17.014 |
| 2016/0048699 A1 | 2/2016 | Syben | | |
| 2021/0173581 A1* | 6/2021 | Uno | .................... | G06F 3/0604 |

OTHER PUBLICATIONS

Bloom, Burton H. "Space/Time Trade-offs in Hash Coding with Allowable Errors," Communications of the ACM. vol. 13. No. 17. Jul. 1970. pp. 422-426, Computer Usage Company, Newton Upper Falls, Mass.

International Search Report and Written Opinion on the Patentability of Application No. PCT/US2021057739 dated Feb. 11, 2022, 9 pages.

International Preliminary Report on Patentability received for PCT Patent Application No. PCT/US21/57739, dated Jun 29, 2023, 6 pages.

* cited by examiner

SYSTEMS AND METHODS FOR HARD DELETION OF DATA ACROSS SYSTEMS

BACKGROUND

Merchants, such as grocers, car services, dry cleaning services, online marketplaces, etc., provide their products and services to consumers. Such merchants may employ agents to deliver their products and/or provide the actual services to the merchant's customers. For example, a person acting on the merchant's behalf will drive a consumer in their own car, deliver food ordered through a merchant website, pick up and/or drop off clothes dry cleaned by the merchant, etc. Consumers therefore often engage, purchase, rent, etc. services and/or products of the merchant or the merchant's agent via a merchant interface, such as a merchant web page, application, or other interface.

These merchants, although providing systems for supplying products and/or services to consumers via their interface, often do not perform the financial processing associated with the merchant transactions. Instead, merchants utilize commerce systems to process financial transactions for the products and/or services provided to consumers. Commerce systems may provide their transaction processing services to the merchant by way of software applications, web pages, application programming interfaces (APIs), etc. The merchant system integrates the commerce system software, APIs, web pages, etc. into the merchant interfaces to handle the processing of consumer transactions. Once integrated, the commerce system, on behalf of the merchant system, can perform processing of payments for goods or services including collecting credit card information from a customer, running credit cards, crediting a merchant account for the transaction, crediting agents responsible for the transaction, debiting a commerce system fee for processing the transaction on behalf of the merchant, interacting with authorization network systems (e.g., bank systems, credit card issuing systems, etc.), as well as performing other commerce related transactions for the merchant and/or agent such as providing payouts for products/services rendered on behalf of the merchant.

During each of these operations performed by the commerce platform during a transaction, the commerce platform may generate and store data associated with the merchant, agent, and/or a customer. The data may include data generated for bookkeeping purposes, record keeping purposes, regulatory requirements, as well as for other reasons. In order to address concerns over how an individual's data is handled by organizations, such as the commerce platform and other systems, regulations have been implemented that give individuals rights in the ownership and access to their data (e.g., data that is generated for a user). For example, the General Data Protection Regulations (GDPR) in the European Union, and the California Consumer Privacy Act (CCPA) in the state of California in the United States, are examples of regulations giving individuals rights to access and control their data. Such rights include the rights to know how their personal data is being used, access their personal data, request to have their data irreversibly deleted, as well as other rights.

Data deletion request rights, under the above noted regulations as well as other similar regulations, are subject to compliance and enforcement. For example, a data deletion request should be handled within a set amount of time (e.g., 30 days, 45 days, 90 days, etc.), proof of data deletion may be required upon a further user request, etc. Furthermore, non-compliance may result in fines or other penalties, as well in the loss of confidence in the users, merchants, and agents of a non-complying organization Data deletion, in response to a request under the GDPR, CCPA, or other regulation, although seeming like a straight forward request, may in practice represent a very difficult engineering problem. That is, the commerce system noted above may be composed of many subsystems (e.g., a transaction processing system, fraud detection system, card network interface system, points tracking system, order management system, user subscription services, etc.) and/or jobs that implement those systems or other internal commerce platform systems (e.g., database jobs, system interfaces, backups, record generation, etc.), that each perform operations during transactions that potentially result in data being generated and stored at various locations. Thus, data of an individual may be distributed across many subs systems and storage locations of the commerce system. To exacerbate the distribution of data access systems, the typical volume of transactions handled by a commerce platform on an hourly, daily, weekly, etc. basis is enormous, often resulting in millions to billions of data records distributed throughout systems, subsystems, and databases of the commerce platform. Therefore, although the concept of processing a data deletion request may seem simple in the abstract, actually handling and performing a requested data deletion within the prescribed time is a difficult technical problem that is extremely resource intensive in terms of computer processing hardware utilization and compute time.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Figure 1:
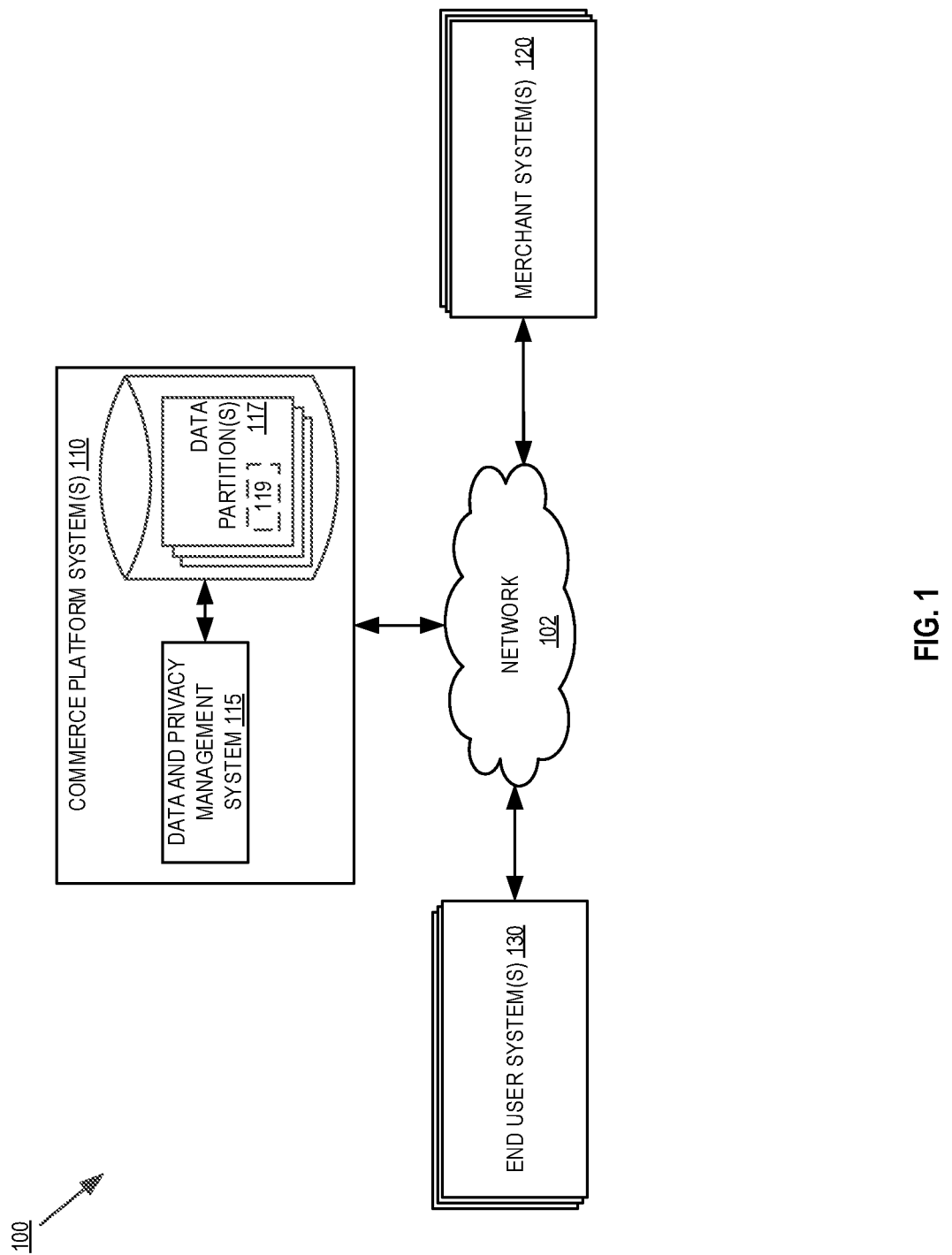
FIG. 1 is a block diagram of an exemplary system architecture for performing hard deletion of data across systems of a commerce platform system.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "authenticating", "determining", "adding", "distributing", "determining", "constructing", "searching", "deleting", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system architecture 100 for performing hard deletion of data across systems of a commerce platform system 110. In one embodiment, the system architecture 100 includes commerce platform system(s) 110, one or more merchant system(s) 120, and one or more end user system(s) 130. In one embodiment, one or more systems (e.g., system 120 and 130) may be mobile computing devices, such as a smartphone, tablet computer, smartwatch, etc., as well computer systems, such as a desktop computer system, laptop computer system, server computer systems, etc. The commerce platform system(s) 110 and merchant system(s) 120 may also be one or more computing devices, such as one or more server computer systems, desktop computer systems, etc.

The embodiments discussed herein may be utilized by a plurality of different types of systems, such as other commerce platform system(s) including payment processing systems, card authorization systems, banks, and other systems seeking to identify and detect fraud during transactions. Furthermore, any system seeking to comply with data deletion requirements may use and/or extend the techniques discussed herein to perform hard data deletion. However, to avoid obscuring the embodiments discussed herein, the operations and techniques for hard data deletion by a commerce platform system are discussed to illustrate and describe the embodiments of the present invention, and are not intended to limit the application of the operations and techniques described herein from applicability to other systems.

The commerce platform system(s) 110, merchant system(s) 120, and end user system(s) 130 may be coupled to a network 102 and communicate with one another using any of the standard protocols for the exchange of information, including secure communication protocols. In one embodiment, one or more of the commerce platform system(s) 110, merchant system(s) 120, and end user system(s) 130 may run on one Local Area Network (LAN) and may be incorporated into the same physical or logical system, or different physical or logical systems. Alternatively, the commerce platform system(s) 110, merchant system(s) 120, and end user system(s) 130 may reside on different LANs, wide area networks, cellular telephone networks, etc. that may be coupled together via the Internet but separated by firewalls, routers, and/or other network devices. In one embodiment, commerce platform system 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, commerce platform system 110 provides financial processing services to one or more merchants, such as to merchant system(s) 120 and/or end user system(s) 130. For example, commerce platform system(s) 110 may manage merchant accounts held at the commerce platform, run financial transactions initiated at end user system(s) 130 performed on behalf of a merchant system 120, clear transactions, performing payouts to merchant and/or merchant agents, manage merchant and/or agent accounts held at the commerce platform system(s) 110, as well as other services typically associated with commerce platforms systems such as, for example, STRIPE™.

In embodiments, data and privacy management system 115 is responsible for interacting with users of end user system(s) 130 and/or users of merchant system(s) 120 to manage a users' rights with respect to the data generated and stored for the users at the commerce platform system(s) 110. In embodiments, data and privacy management system 115 may generate and/or implement data privacy interface(s), such as web page based graphical user interfaces served to end user system(s) 130 and/or merchant systems(s) 120 enabling end users to request hard data deletion of user data maintained at commerce platform system(s) 110. That is, hard data deletion is a permanent and irreversible data deletion of a given user's data from the commerce platform system(s) 110. Additional interfaces may be implemented by the commerce platform system(s) 110, such as endpoint(s) for receiving written requests for hard data deletion. Furthermore, following data deletion completion, as discussed in greater detail herein, an end user of a user system 130 or merchant system 120 may return to the interfaces generated by data and privacy management system 115 to obtain proof of the requested hard data deletion, such as viewing what data deletion operations was performed, and when it was completed.

Such data deletion requests received by the commerce platform system(s) 110 may be regulatory based (e.g., requests received under GDPR, CCPA, or other regulation), giving commerce platform system(s) 110 a predetermined length of time in which to complete the requested data deletion (e.g., within 1 month, within 90 days, etc.). However, hard data deletion requests may also be policy based, such as the commerce platform system(s) 110 recognition in individual's rights to the control of their own data. Thus, hard data deletion may be implemented by the commerce platform system(s) 110, as discussed below, to ensure users have ultimate control and ownership of their data.

As discussed herein, the commerce platform system(s) 110 may be composed of a number of subsystems that each perform operations, generate data, store data, etc. during each transaction processed by the commerce platforms system(s) 110. Because the commerce platform system 110 is responsible for processing a large number of transactions each second, minute, hour, day, week, etc. commerce platform system(s) 110 employ techniques for logically and efficiently organizing data storage. In embodiments, each different end user and merchant may be associated with a unique identifier that is used as metadata within each transaction, data record, job, operation, etc. to identify and associate the transaction, data record, job, operation, etc. with the appropriate user/merchant. By using unique identifiers, commerce platform system(s) 110 are able to differentiate and organize data records associated with each individual end-user, merchant user, etc. across the various commerce platform subsystems, data storage systems, commerce platform jobs that operate on user data, etc.

Furthermore, given the number of transactions handled by the commerce platform system(s) 110 on a regular basis, commerce platform system(s) 110 utilizes a data storage scheme where sets of data records (e.g. job records, transaction records, etc.) are subdivided on predetermined basis into data partitions 117. That is, data that would otherwise be maintained in a single data set, database, data snapshot, etc., is logically subdivided into constituent parts that together make up the whole. In embodiments, each different commerce platforms system 110 subsystem, job, etc. may each be associated with its own partitions that are logically or physically separated in memory/storage systems of the commerce platform system(s) 110. Thus, data partitions 117 may be created for each subsystem, job, etc. according to predetermined subdivision rules (e.g., new partition creation hourly, daily, weekly, based on thresholds such as a number of records within a partition, based on thresholds such as a number of number of transaction performed, etc.) for storage of data records that is generated prior to the next predetermined subdivision (e.g., data generated within the hour, day, week, number or records, number of transactions, etc.).

Thus, given the volume of transactions handled by commerce platforms system(s) 110, how many data partitions are created for storing data records, how many commerce platform subsystems each are associated with their own subsets of data partitions, etc., the technical problems associated with locating and performing hard data deletion on data becomes acute. For example, a single user transaction may result in user data being distributed in a number of locations (e.g., partitions) across commerce platform system 110 subsystems, where each partition is one of a larger set of partitions for a given subsystem, job, etc. That is, there may be numerous partitions having a large number of records, and searching each data record of each partition of each system of the commerce platform represents an extremely memory intensive and computationally resource intensive operation. Furthermore, in distributed computing environments where computer resources and computer time may be purchased from third parties, processing data deletion requests further becomes extremely expensive when such compute time is accounted for.

In embodiments, to reduce computation time and processing usage for performing hard data deletion, while ensuring a high degree of accuracy, data privacy and management system 115 generates, for each data partition, a bloom filter 119. The bloom filter 119 is a deterministic and probabilistic data structure that indicates whether data exists within the partition 117. In embodiment, the unique user identifiers generated for each user are used by the data and privacy management system 115 when generating each of the bloom filters 119 to therefore indicate whether a data record exists within a partition 117 having the unique user identifier. By deploying a bloom filter 119 for each data partition 117, data and privacy management system 115 is able to quickly determine whether data for a given user requesting data deletion exists within a partition, and thus whether a partition should be searched for, and data deleted from, that partition. It should be noted that each bloom filter is deterministic in that it can provide, without false negatives, an indication of whether a partition 117 includes a data record having a given unique user identifier. Bloom filters, however, do not indicate where in a data partition 117 a data record exists. Furthermore, bloom filters are a fraction of the size of data partitions, thereby making the search of the bloom filters much more memory and compute efficient. Thus, data and privacy management system 115 is able to greatly reduce processing resource utilization by determining which data partitions 117 should be further searched. Beneficially and as a result, instead of loading every partition into memory, and then searching every partition in an exhaustive brute force style search, data and privacy managing system 115 utilizes the bloom filters to perform a smart search prior to loading and searching data within the actual partition(s) 117.

In embodiments, after determining a subset of data partition(s) 117 to search based on the use of the bloom filters generated for each partition 117, data and privacy management system 115 may then load into memory each partition in the subset to locate any records having the unique user identifier. By processing only the subset of data partition(s) 117 to complete a hard data deletion request, and not all partitions 117, data and privacy management system 115 may complete requested data deletion operations in less time, in a deterministic fashion, and using less computer resources. Therefore, when found, a user's data may be deleted, and a data deletion record generated by the data and privacy management system 115 indicating when and how the operation was completed. Each data deletion record is associated with the unique user identifier of the user requesting the data deletion, and may then be used to compile a report from aggregated data deletion records for a given unique identifier. In embodiments, data and privacy management system 115 may then provide such reports to the original requesting end user system 130 as proof of the data deletion operations, and in compliance by the regulations giving rise to the request.

Figure 2:
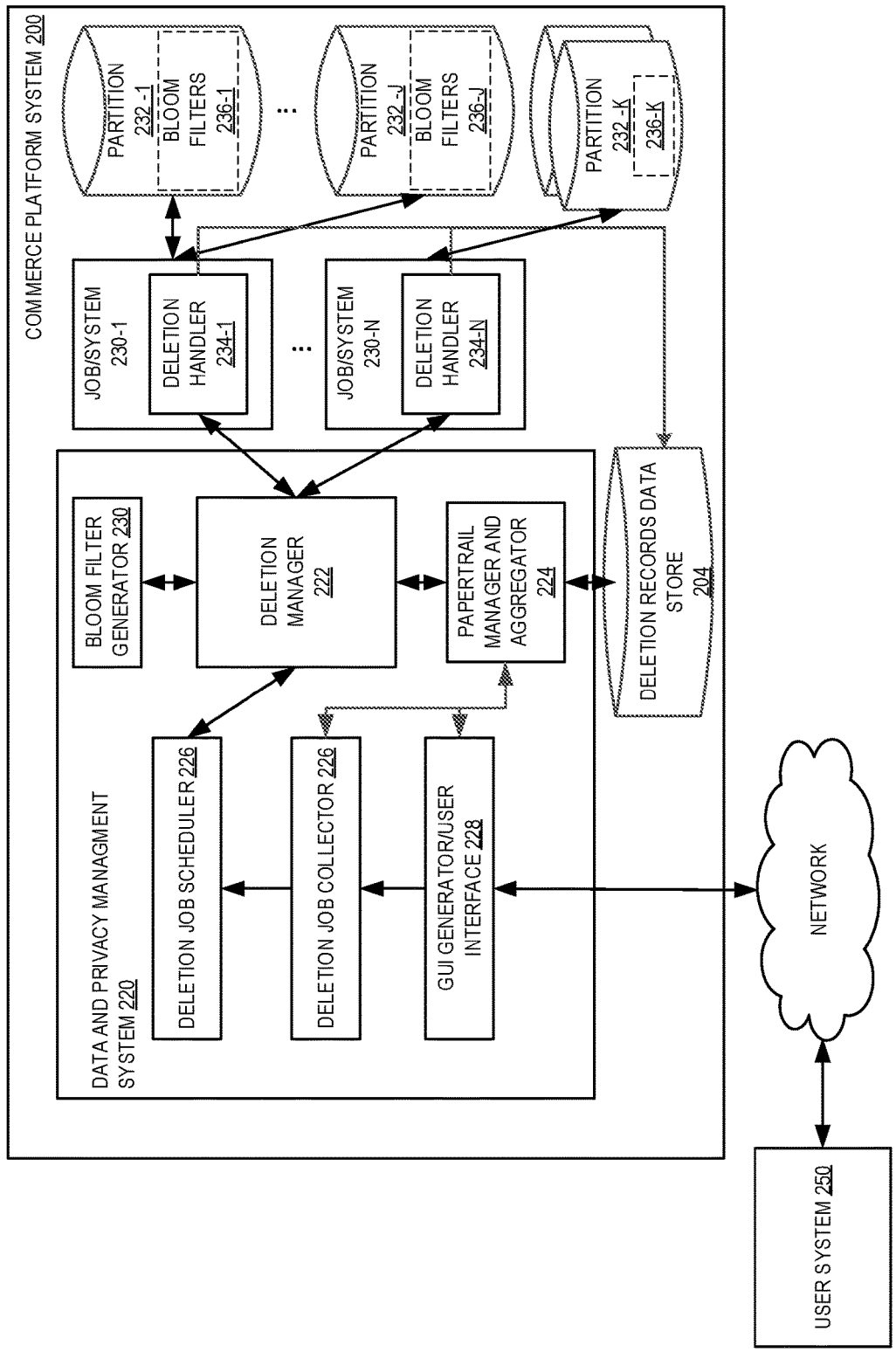
FIG. 2 is a block diagram of one embodiment of a commerce platform system for performing hard deletion of data.

FIG. 2 is a block diagram of one embodiment of a commerce platform system 200 for performing hard deletion of data. Commerce platform 200 provides additional details for the commerce platform system(s) 110 discussed above in FIG. 1.

In one embodiment, commerce platform 200 includes various jobs/systems 230-1 through 230-N that are each responsible for performing the various operations of the commerce platform system 200, such as during transaction processing. When performing the operations, each job/system 230 stores data in an associated partition in a set of partitions (e.g., job/system 230-1 stores data within the set of partitions 232-1 through 232-J, job/system 230-N stores data in a partition that is part of a subset of partitions 232-K). Furthermore, as discussed herein, partitions may be created on a regular basis, such as hourly, daily, weekly, based on thresholds, etc. to further organize and reduce the size of each partition, and thus the number of partitions within each subset increases over time.

In embodiments, and prior to receiving a data deletion request, such as from a user of user system 250, bloom filter generator 230 is responsible for generating a bloom filter for each partition using unique user identifiers maintained by the commerce platform system 200. By using the unique user identifiers generated by commerce platform system, which is data included within records in each partition, the bloom filter will provide an accurate indication of whether there are any data records within a partition for a given unique identifier. Bloom filter generator 230 may generate bloom filters for each partition as it is replaced by a new partition (e.g., at the end of each hour, day, week, etc.). Alternatively, bloom filter generator 230 may generate bloom filters for each partition on a scheduled basis regardless of when new partitions are allocated. As discussed above, each bloom filter is a probabilistic data structure that is a fraction of the size of its associated partition, and provides an indication whether a data record exists within a partition having a specific unique identifier. A property of bloom filters is that they may give false positive indications (e.g., an indication that a data record for a given identifier exists within a partition when it is not present in reality), and will never give false negatives (e.g., an indication that no data records for a given identifier exist within a partition, even when a data record with the given identifier does exist), which ensures that all occurrences of data records with unique identifiers will be locatable based on the queries of the associated bloom filters. Furthermore, each bloom filter is statistically tunable so that a likelihood of a false positive result can be increased or reduced, based on a size consideration of each bloom filter.

Thus, each partition 232 is associated with its own bloom filter 236, so that given a unique identifier of a user, a deletion handler 234 of a job/system 230 can query the bloom filter to determine whether the partition includes a data record with the unique identifier. Thus, the deletion handlers 234 may quickly query the set of bloom filters for their corresponding partitions to quickly and accurately determine which partitions contain relevant user data. As discussed herein, data and privacy management system 220 utilizes the bloom filter to determine which partitions to load into memory and search for data records to be deleted.

In embodiments, GUI generator/user interface 228 of the data and privacy management system 220 is responsible for interacting with user system 250 via network. For example, GUI generator/user interface 228 may generate a web based interface for receiving data deletion requests from a user of user system 250. Alternatively, GUI generator/user interface 228 may receive written or audio requests (e.g. email, text, telephone, etc.). In embodiments, the GUI generator/user interface 228 may further authenticate a user prior to accepting a data deletion request, such as by verifying a commerce platform username/password of the user, performing two-factor authentication, or a combination. Furthermore, in the received request, GUI generator/user interface 228 determines a unique user identifier associated with the request. In embodiments, the unique user identifier may be received in the user deletion request, such as the user specifying their IP address, email address, telephone number, etc. However, in embodiments, GUI generator/user interface 228 may look up a unique user identifier used within the commerce platform system 200 (e.g., a commerce platform assigned global unique identifier, cryptographically signed identifier, etc.). In any embodiment, the unique user identifier is provided to deletion job collector 226.

Deletion job collector 226 is responsible for creating a batch of deletion jobs. That is, deletion job collector 226 collects a set of deletion requests and associated unique user identifiers for a set of users over a period of time. For example, deletion jobs may be collected over a day, week, month, etc., and the corresponding batch of unique identifiers associated with the hard deletion requests provided to the deletion job scheduler 226. In some embodiments, scheduler 226 schedules specific deletion jobs based on when a deletion was created to ensure deletion is completed within a regulation's required timeframe, within a policy timeframe of the commerce platform system 200, or some other timeframe. Deletion job scheduler 226 then forwards the unique identifiers from the batch to deletion manager 222 at the predetermined time. For example, at the expiration of the day, week, month, etc., deletion job scheduler 226 forwards the unique identifiers to the deletion manager 222.

Deletion manager 222 than processes the deletion of data records pursuance to the user requests by further distributing the unique identifiers for which data is to be deleted to each deletion handler 234-1 through 234-N, which correspond to the various jobs/systems 230-1 through 230-N of the commerce platform system 200, as discussed above.

In embodiments, each deletion handler 234 optionally transforms received unique identifiers. That is, some jobs/systems will transform a unique identifier when performing a commerce platform operation (e.g., adding a bit of data to a unique ID for tracking purposes, signing the unique ID with a cryptographic signature for security purposes, etc.). In embodiments, such transformed unique identifiers would then be used by the job/system when generating data records in corresponding partitions. Thus, if applicable, a deletion handler 234 would also perform the transformation on received unique identifiers to ensure that the appropriate data records are located based on transformed values of the unique identifiers. However, not all jobs/systems 230 transform unique identifiers, in which case the corresponding deletion handler 234 could use the received unique identifiers.

Each deletion handler, for example deletion handler 234-1 then loads into a memory bloom filters 236-1 through 236-$j$ to determine if corresponding partitions are predicted to have data records with given unique identifiers (transformed or original). The deletion handler 234-1 may be configured to load into memory and search the bloom filters 236-1 through 236-$j$ in parallel, since the size and complexity of such a search would be a fraction of searching the individual partitions, and further to process the initial bloom filter search in less time. Then, partitions predicted to contain a data record having a unique identifier, based on results obtained by searching the bloom filters for a set of partitions, are collected into subsets of partitions for a full search.

Furthermore, in embodiments, deletion handlers and/or bloom filters may be hierarchical. That is, certain jobs/systems may be downstream jobs/systems that receive input from upstream jobs/systems. In such a case, only if an upstream job/system feeds a downstream job/system will the downstream job/system contain a data record for a given unique identifier (e.g., only if fed from the upstream job/system). Thus, the loading into memory and searching of bloom filters associated with certain jobs/system performed is also hierarchical to further optimize memory usage and computational resources. For example, an upstream job/system's bloom filter(s) may be searched prior to downstream job/system's bloom filter(s) so that if an upstream job/system does not contain a relevant data record, then the searching of the downstream job/system is skipped further saving time and computing resources.

After the deletion handlers 234 perform their respective bloom filter 236 searching, the deletion handlers will then load into memory and search only those partitions 232 which have been determined as likely containing a relevant record (e.g. based on the bloom filter prediction). Thus, a greatly reduced number of partitions is searched for deletion purposes. When a record having a unique identifier associated with a deletion request, the deletion handler 234 performs the hard data deletion and generates data deletion record, which is provided back to the papertrail manager and aggregator 224 for storage in deletion records data store 204.

Figure 3:
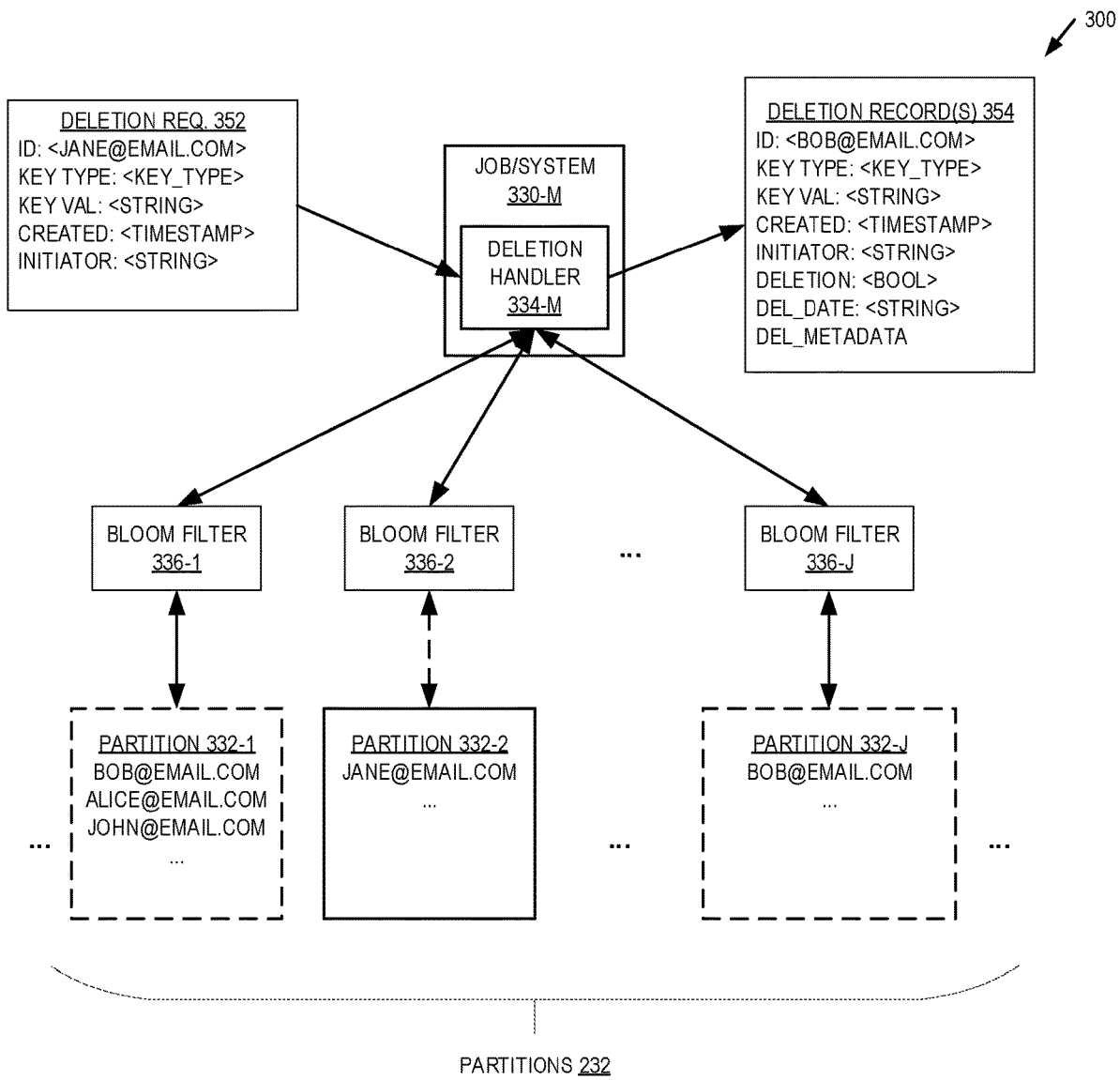
FIG. 3 is a block diagram of one embodiment of a commerce platform system utilizing filters when performing data deletion.

With reference to FIG. 3, a deletion request 352 generated by the deletion manager 222 is received at a job/system 330-M. The deletion request may specify the unique identifier of the user who is the subject of the hard deletion request (in the illustrated example an email address), as well as other data, such as key type defining the type of date to be deleted (e.g. the unique ID, an IP address, and email address, etc.), the key value providing the actual data to be deleted, a date when the deletion request was created, and who initiated the request. Furthermore, in embodiments, a deletion request may include more than one key type and value combination for hard deletion. The deletion handler 334-M of the job/system 330-M receives the request, and loads into memory each bloom filter 336-1, 336-2, through 336-J associated with each partition 332-1, 332-2, through 332-J. Each bloom filter may then be processed, for example in parallel by one or more processors, by deletion handler 334-M by searching the bloom filter data structures to determine if a corresponding partition has a data record with the unique identifier. As illustrated, only bloom filter 336-2 will indicate that partition 332-2 has a relevant data record. Thus, deletion handler 334-M may process the deletion request by only loading partition 332-2 and not the other partitions, thereby reducing memory usage and increasing the efficiency with which the underlying deletion occurs. Once the record in partition 332-2 is found and permanently deleted by deletion handler 334-M, the deletion request is transformed/updated into the deletion record 354 that includes data indicating whether deletion occurred, the date on which it occurred, and optional metadata describing the deletion. Returning to FIG. 2, this data record 354 is then stored in deletion records data store 204.

In embodiments, GUI generator/user interface 228 may then respond to a deletion progress request by a user, based on the user identifier associated with the deletion request. The user identifier is provided to the papertrail manager and aggregator 224, which queries data store 204 using the unique identifier, aggregates deletion records for the given unique identifier, and provides an accounting and summary of the data deletion to the user system 250. The accounting and summary may be provided as a graphical user interface, a file for download, or a combination thereof.

Figure 4:
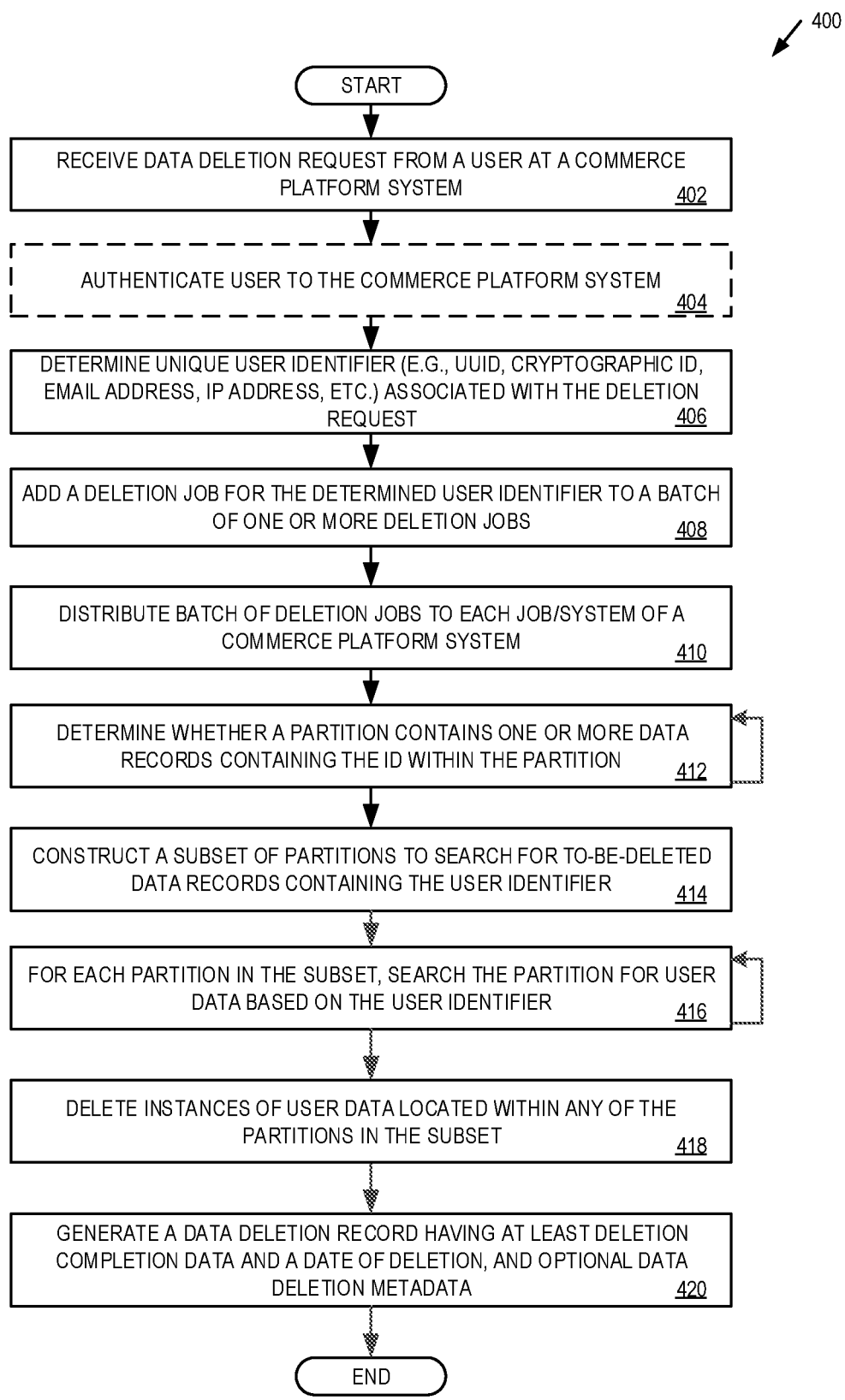
FIG. 4 is a flow diagram of one embodiment of a method for a commerce platform system performing hard data deletion.

FIG. 4 is a flow diagram of one embodiment of a method 400 for a commerce platform system performing hard data deletion. The method 400 is performed by processing logic that may comprise hardware (circuitry, dedicated logic, etc.), software (such as is run on a general purpose computer system or a dedicated machine), firmware, or a combination. In one embodiment, the method 400 is performed by a commerce platform system (e.g., commerce platform system 110 or commerce platform system 200).

Referring to FIG. 4, processing logic begins by receiving a data deletion request from a user at a commerce platform system (processing block 402). As discussed herein, the request may be received via a graphical user interface, or directly as a voice or text message. Furthermore, the data deletion request may be made pursuant to a data protection regulation, a privacy policy of the commerce platform, or a combination thereof.

Processing logic optionally authenticates the user to the commerce platform system (processing block 404). That is, in embodiments, the user may be required to prove their identity prior to deletion operation being performed. For example, a user may be required to supply a username and password combination maintained by the commerce platform system, supply or verify information associated with the user (e.g., last four digits of a government identifier, street of residence, etc.), or perform another form of user authentication.

Processing logic determines a unique user identifier associated with the deletion request (processing block 406). In embodiments, the unique user identifier may be explicitly received via the request, such as the user specifying their user name, email address, telephone number, etc. to be used as the unique identifier. The unique identifier may be implicitly received from the user, such as processing logic sensing/obtaining an IP address of the user's computer system. The unique user identifier may also be determined by the commerce platform, such as by associating received user information with a unique identifier (e.g., a globally unique ID, cryptographically signed ID, etc.) generated and maintained internally by the commerce platform system.

After determining the unique user identifier, processing logic adds a deletion job for the determined unique user identifier to a batch of one or more deletion jobs (processing block 408). In embodiments, the adding may include immediately forwarding a deletion job for processing. In other embodiments, adding may include scheduling a future time when deletion is to be performed, in concert with other deletion jobs. For example, the scheduling may include scheduling batch deletion jobs at a time when computer usage of a commerce platform system is historically low.

Processing logic then distributes the batch of deletion jobs to each job/system of a commerce platform system (processing block 410) to determine whether a data partition, which stores data records for a corresponding commerce platform system/job, contains one or more data records containing the unique user identifier within the partition (processing block 412). In embodiments, and as discussed above, processing logic utilizes the unique user identifier to query a bloom filter generated for each partition, where the bloom filter is a probabilistic data structure indicting whether data exists within the partition having the unique identifier. Furthermore, processing logic repeatedly performs processing block 412 for each partition by searching the corresponding bloom filters. In some embodiments, where bloom filters are hierarchically organized (e.g., based on upstream/downstream job status), processing logic may skip the performing of processing block 412 for partitions for which downstream bloom filters are determined not to have a corresponding upstream bloom filter indicating the existence of a data record for the unique user identifier.

Processing logic then constructs a subset of partitions to search for to-be-deleted data records containing the user identifier (processing block 414). The subset of partitions represents partitions determined to contain to-be-deleted data records. However, because bloom filters provide a guarantee of no false negative, but potentially false positives, the determination must be confirmed via the searching. The therefore subset represents a set of partitions which are predicted to contain one or more data records each with the unique user identifier, based on their respective bloom filters. The subset further is a reduced set of partitions, where data records are likely to exist, thereby enabling processing logic to more efficiently search for and delete associated data records. For each partition in the subset, processing logic searches the partition for data records based on the unique user identifier (processing block 416).

When data records are found, processing logic deletes instances of user data located within any of the partitions in the subset (processing block 418). Processing logic then generates a data deletion record having at least deletion completion data and a date of deletion, and optional data deletion metadata (processing block 420). Then, as discussed herein, the data deletion records may be aggregated and provided to the requesting user as proof the data deletion operations being performed.

Figure 5:
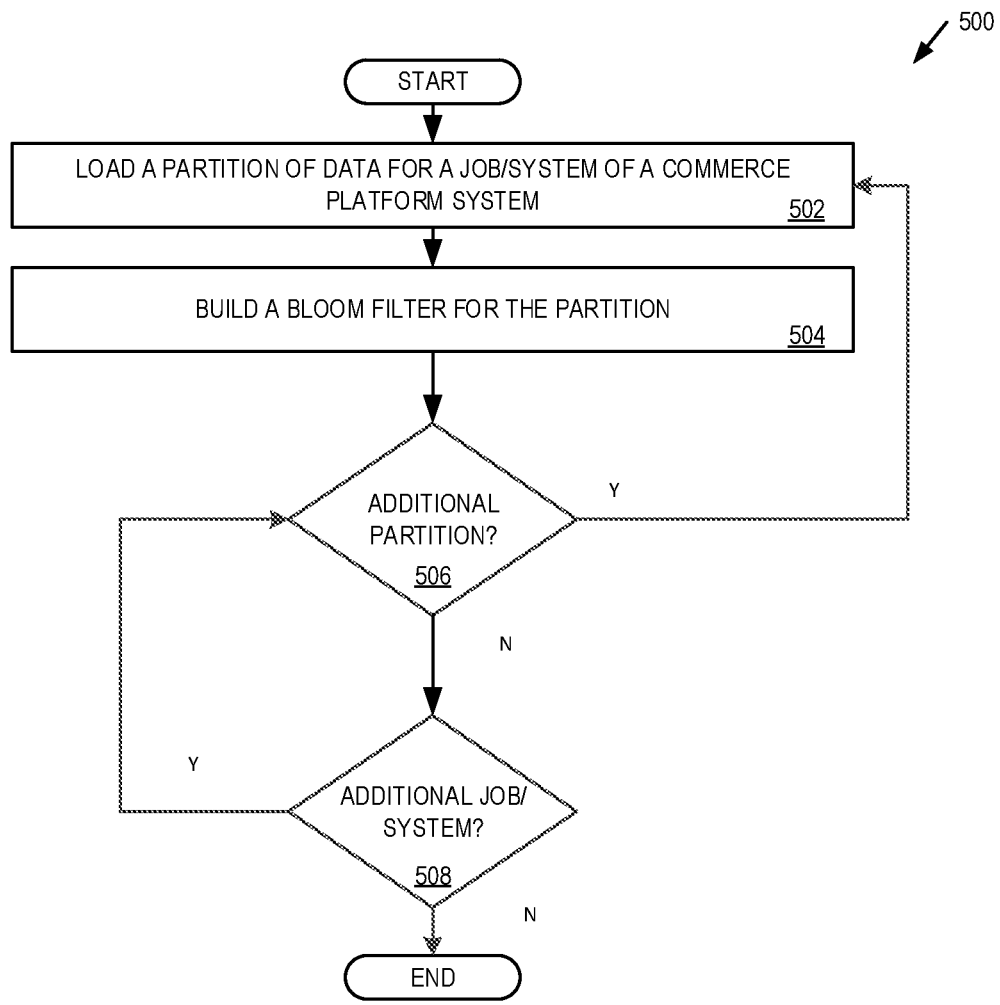
FIG. 5 is a flow diagram of one embodiment of a method for a commerce platform system generating bloom filters for use during data deletion.

FIG. 5 is a flow diagram of one embodiment of a method 500 for a commerce platform system generating bloom filters for use during data deletion. The method 500 is performed by processing logic that may comprise hardware (circuitry, dedicated logic, etc.), software (such as is run on a general purpose computer system or a dedicated machine), firmware, or a combination. In one embodiment, the method 500 is performed by a commerce platform system (e.g., commerce platform system 110 or commerce platform system 200). The method 500 may be used to construct bloom filters on an ongoing basis as new partitions are created, as discussed herein. Furthermore, the method 500 may be used to backfill or generate bloom filters for past partitions when initially constructing a set of bloom filters.

Referring to FIG. 5, processing logic begins by loading a partition of data for a job/system of a commerce platform system (processing block 502). In embodiments, processing logic may perform the loading of partitions at a predetermined time, such as after new partitions are allocated, at a specific date/time (e.g., very day, week, hour, etc.). Processing logic then constructs a bloom filter for the partition (processing block 504). If processing logic determines that there are additional partitions (processing block 506), processing logic returns to processing block 502 to load a next partition for construction of its bloom filter.

However, when there are no additional partitions for a job/system, processing logic determines whether there are additional jobs/systems (processing block 508). When there are additional jobs/systems, Processing logic returns to processing block 506 to determine if there are any additional partitions for the new job/system (processing block 506). If there are partitions for the job/system, processing logic again returns to processing block 502 to load the partition and build the bloom filter.

Otherwise, when there are no remaining partitions which do not already have a bloom filter, and there are no new jobs/systems, the process ends.

Figure 6:
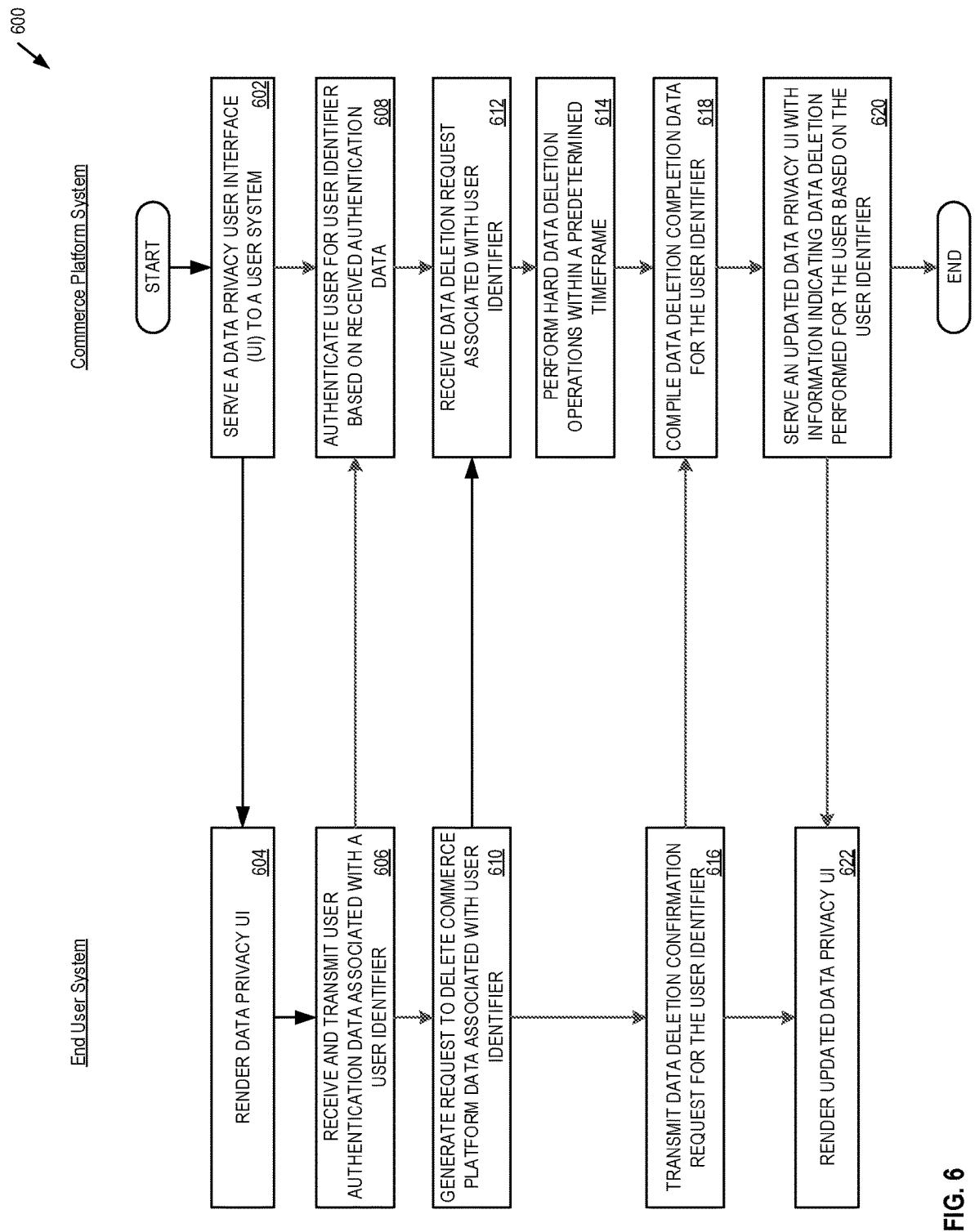
FIG. 6 is a flow diagram of one embodiment of a method for a commerce platform system and an end user system interacting during a hard deletion request.

FIG. 6 is a flow diagram of one embodiment of a method 600 for a commerce platform system and an end user system interacting during a hard deletion request. The method 600 is performed by processing logic that may comprise hardware (circuitry, dedicated logic, etc.), software (such as is run on a general purpose computer system or a dedicated machine), firmware, or a combination. In one embodiment, the method 600 is performed by a commerce platform system (e.g., commerce platform system 110 or commerce platform system 200) and an end user system (e.g., end user system 130 or user system 250).

Referring to FIG. 6, processing logic of the commerce platform begins by serving a privacy user interface to a user system (processing block 602). The user interface may be a web page based user interface, data to populate a mobile app, etc.

Processing logic of the end user system renders the data privacy user interface (processing block 604). Processing logic of the end user system then receives and transmits authentication data associated with a user identifier (processing block 606). For example, a user of the end user system may first authenticate her identity via the authentication information (e.g., username/password, code sent via two-factor auth. process, third party authentication, etc.), as proof of their ability to request data deletion for the user identifier (processing block 610).

Processing logic of the commerce platform system authenticates the user for the user identifier based on the received authentication data (processing block 608). Furthermore, subsequent to the authentication verification, processing logic receives the user's data deletion request associated with the user identifier (processing block 612). In some embodiments, a user requesting data deletion may not be the same user for which data is being deleted. For example, a merchant user may request deletion of data records of their agent pursuance to a data deletion request received at the merchant system. In other embodiments, the user who authenticated himself to the commerce platform system is the same user seeking deletion of his data.

In either embodiment, processing logic uses user identifiers to perform hard data deletion operations within a predetermined timeframe (processing block 614). In embodiments, the timeframe may be prescribed by a regulation (e.g., GDPR, CCPA, etc.). In other embodiments, the timeframe may be prescribed by policy of a commerce platform system. Furthermore, the data deletion operations performed by processing logic in block 614 may include those discussed in any combination of FIGS. 1-4.

Processing logic of the end user system may then transmit a data deletion confirmation request for the user identifier (processing block 616). In response to the request, processing logic of the commerce platform system compiles data deletion completion data for the user identifier (processing block 618), and serves an updated data privacy user interface with information indicating data deletion performed for the user based on the user identifier (processing block 620). The processing logic of the end user system may then render the updated data privacy user interface (processing block 622).

Figure 7:
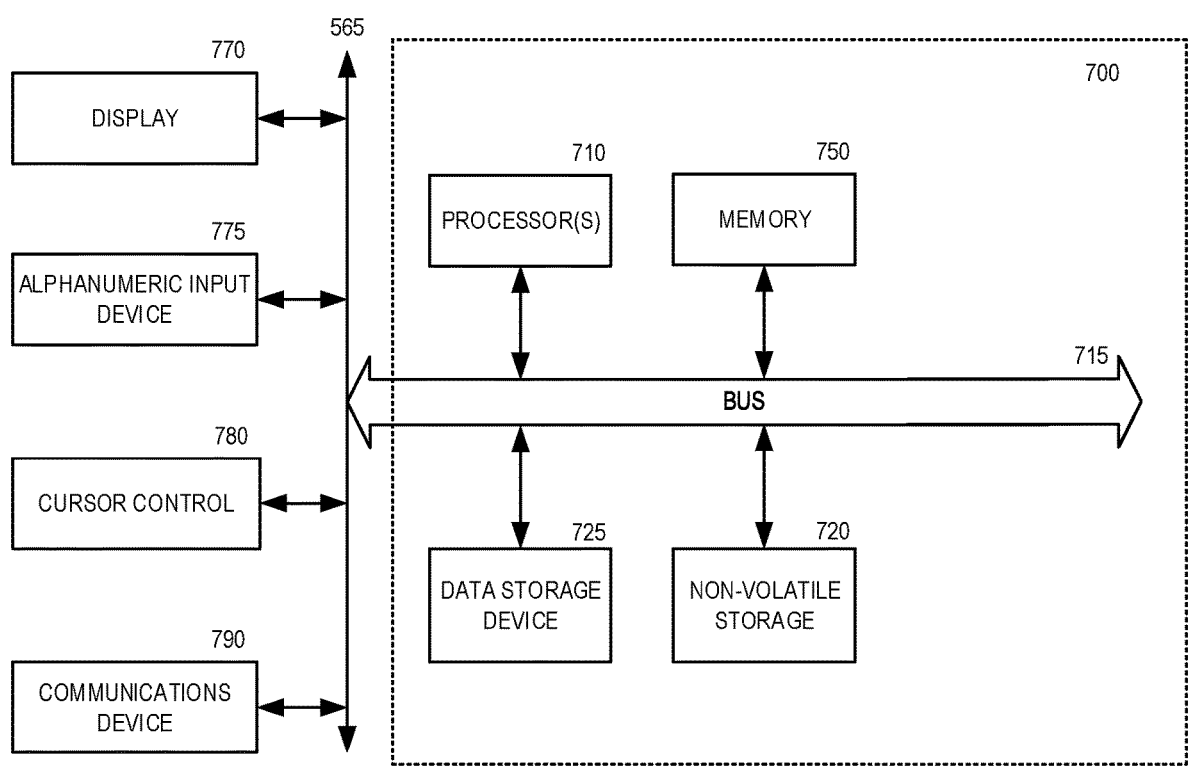
FIG. 7 is one embodiment of a computer system that may be used to support the systems and operations discussed herein.

FIG. 7 is one embodiment of a computer system that may be used to support the systems and operations discussed herein. For example, the computer system illustrated in FIG.

7 may be used by a commerce platform system, a merchant development system, merchant user system, etc. It will be apparent to those of ordinary skill in the art, however that other alternative systems of various system architectures may also be used.

The data processing system illustrated in FIG. 7 includes a bus or other internal communication means 715 for communicating information, and a processor 710 coupled to the bus 715 for processing information. The system further comprises a random access memory (RAM) or other volatile storage device 750 (referred to as memory), coupled to bus 715 for storing information and instructions to be executed by processor 710. Main memory 750 also may be used for storing temporary variables or other intermediate information during execution of instructions by processor 710. The system also comprises a read only memory (ROM) and/or static storage device 720 coupled to bus 715 for storing static information and instructions for processor 710, and a data storage device 725 such as a magnetic disk or optical disk and its corresponding disk drive. Data storage device 725 is coupled to bus 715 for storing information and instructions.

The system may further be coupled to a display device 770, such as a light emitting diode (LED) display or a liquid crystal display (LCD) coupled to bus 715 through bus 765 for displaying information to a computer user. An alphanumeric input device 775, including alphanumeric and other keys, may also be coupled to bus 715 through bus 765 for communicating information and command selections to processor 710. An additional user input device is cursor control device 780, such as a touchpad, mouse, a trackball, stylus, or cursor direction keys coupled to bus 715 through bus 765 for communicating direction information and command selections to processor 710, and for controlling cursor movement on display device 770.

Another device, which may optionally be coupled to computer system 700, is a communication device 790 for accessing other nodes of a distributed system via a network. The communication device 790 may include any of a number of commercially available networking peripheral devices such as those used for coupling to an Ethernet, token ring, Internet, or wide area network. The communication device 790 may further be a null-modem connection, or any other mechanism that provides connectivity between the computer system 700 and the outside world. Note that any or all of the components of this system illustrated in FIG. 7 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 750, mass storage device 725, or other storage medium locally or remotely accessible to processor 710.

It will be apparent to those of ordinary skill in the art that the system, method, and process described herein can be implemented as software stored in main memory 750 or read only memory 720 and executed by processor 710. This control logic or software may also be resident on an article of manufacture comprising a computer readable medium having computer readable program code embodied therein and being readable by the mass storage device 725 and for causing the processor 710 to operate in accordance with the methods and teachings herein.

The embodiments discussed herein may also be embodied in a handheld or portable device containing a subset of the computer hardware components described above. For example, the handheld device may be configured to contain only the bus 715, the processor 710, and memory 750 and/or 725. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 710, a data storage device 725, a bus 715, and memory 750, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

We claim:

1. A computer implemented method for hard deletion of user data, the method comprising:
   receiving, at a computer system, a request from a user computer system to delete user data;
   determining, by the computer system, a unique user identifier associated by the computer system with a user making the request;
   determining, by the computer system, whether a data partition, in which data generated by a job or subsystem of the computer system is stored, is predicted to contain a record having the unique user identifier by searching a hierarchical set of filters, wherein an upstream job or subsystem associated with a first filter in the hierarchical set of filters feeds data to a downstream job or subsystem associated with a second filter in the hierarchical set of filters, wherein each filter in the hierarchical set of filters is associated with a particular data partition and comprises a data structure that indicates a deterministic prediction of whether a data record associated with a given unique user identifier exists within the particular data partition, wherein the first filter and the second filter are arranged relative to one another in the hierarchical set of filters based on an upstream and a downstream status of jobs or subsystem associated with the first filter or the second filter, and wherein searching the hierarchical set of filters comprises:

searching a first data structure comprised in the first filter to determine whether an upstream data partition of the upstream job or subsystem is predicted to contain the record having the unique user identifier, and when the upstream data partition of the upstream job or subsystem is predicted to contain the record having the unique user identifier, searching a second data structure comprised in the second filter that is downstream of the first filter based on the arrangement of the hierarchical set of filters, to determine whether a downstream data partition of the downstream job or subsystem is predicted to contain the record having the unique user identifier;

searching, one or more of the upstream data partition and the downstream data partition by the computer system, when a corresponding data partition is predicted to contain the record having the unique user identifier, data records stored in the corresponding data partition for a user data record based on the unique identifier; and performing, by the computer system, a hard deletion of the user data record from the corresponding data partition when found during the searching.

2. The method of claim 1, wherein determining whether the data partition is predicted to contain a record having the unique user identifier further comprises:

searching at least one bloom filter based on the unique user identifier to determine whether the data partition is predicted to contain the record having the unique user identifier, the at least one bloom filter generated for the data partition using unique user identifiers in records stored within the data partition; and when the search of the at least one bloom filter indicates that the data partition is predicted to contain the record having the unique user identifier, performing the search of the data partition to determine whether the record having the unique user identifier is contained within the data partition.

3. The method of claim 2, wherein searching the hierarchical set of filters further comprises:

searching a hierarchical set of bloom filters, wherein each bloom filter in the set of bloom filters is generated for a corresponding data partition in a set of data partitions using unique user identifiers in records stored within each data partition, and wherein each data partition of the set of data partitions stores data generated by the job or subsystem of the computer system;

constructing a subset of two or more data partitions predicted to contain records having the unique user identifier, the subset of two or more data partitions comprising the data partition; and searching, by the computer system, data records stored in each of the two more data partitions in the subset for user data records based on the unique identifier.

4. The method of claim 3, further comprising:

loading the hierarchical set of bloom filters into a memory of the computer system; and searching the hierarchical set of bloom filters in parallel by one or more processors of the computer system.

5. The method of claim 1, further comprising:

authenticating an identity of the user making the request prior to determining the unique user identifier.

6. The method of claim 1, further comprising:

in response to performing the hard deletion, generating a data deletion results record of the hard deletion comprising at least the unique identifier associated with the user, data indicative of the hard deletion having occurred, and a date when the hard deletion occurred;

in response to receiving a second request from the user computer system for a status of the request, aggregating one or more data deletion results records based on the unique identifier associated with the user; and returning, by the computer system to the user computer system, a report comprising a data deletion summary based on the aggregated one or more data deletion results records.

7. The method of claim 1, wherein the computer system comprises a plurality of subsystems that each are configured to execute one or more jobs that process and store user data.

8. The method of claim 1, wherein the computer system comprises a commerce platform system.

9. The method of claim 1, wherein the hard data deletion is performed within a predetermined amount of time after receiving the request from the user computer system, the predetermined amount of time comprising a duration of time prescribed by regulation or a duration of time prescribed by a policy of the computer system.

10. A non-transitory computer readable storage medium including instructions that, when executed by a processor, cause the processor to perform operations for hard deletion of user data, the operations comprising:

receiving, at a computer system, a request from a user computer system to delete user data;

determining, by the computer system, a unique user identifier associated by the computer system with a user making the request;

determining, by the computer system, whether a data partition, in which data generated by a job or subsystem of the computer system is stored, is predicted to contain a record having the unique user identifier by searching a hierarchical set of filters, wherein an upstream job or subsystem associated with a first filter in the hierarchical set of filters feeds data to a downstream job or subsystem associated with a second filter in the hierarchical set of filters, wherein each filter in the hierarchical set of filters is associated with a particular data partition and comprises a data structure that indicates a deterministic prediction of whether a data record associated with a given unique user identifier exists within the particular data partition, wherein the first filter and the second filter are arranged relative to one another in the hierarchical set of filters based on an upstream and a downstream status of jobs or subsystem associated with the first filter or the second filter, and wherein searching the hierarchical set of filters comprises:

searching a first data structure comprised in the first filter to determine whether an upstream data partition of the upstream job or subsystem is predicted to contain the record having the unique user identifier, and when the upstream data partition of the upstream job or subsystem is predicted to contain the record having the unique user identifier, searching a second data structure comprised in the second filter that is downstream of the first filter based on the arrangement of the hierarchical set of filters, to determine whether a downstream data partition of the downstream job or subsystem is predicted to contain the record having the unique user identifier;

searching, one or more of the upstream data partition and the downstream data partition by the computer system, when a corresponding data partition is predicted to contain the record having the unique user identifier, data records stored in the corresponding data partition for a user data record based on the unique identifier; and performing, by the computer system, a hard deletion of the user data record from the corresponding data partition when found during the searching.

11. The non-transitory computer readable storage medium of claim 10, wherein determining whether the data partition is predicted to contain a record having the unique user identifier further comprises:

searching at least one bloom filter based on the unique user identifier to determine whether the data partition is predicted to contain the record having the unique user identifier, the at least one bloom filter generated for the data partition using unique user identifiers in records stored within the data partition; and when the search of the at least one bloom filter indicates that the data partition is predicted to contain the record having the unique user identifier, performing the search of the data partition to determine whether the record having the unique user identifier is contained within the data partition.

12. The non-transitory computer readable storage medium of claim 11, wherein searching the hierarchical set of filters further comprises:

searching a hierarchical set of bloom filters, wherein each bloom filter in the set of bloom filters is generated for a corresponding data partition in a set of data partitions using unique user identifiers in records stored within each data partition, and wherein each data partition of the set of data partitions stores data generated by the job or subsystem of the computer system;

constructing a subset of two or more data partitions predicted to contain records having the unique user identifier, the subset of two or more data partitions comprising the data partition; and searching, by the computer system, data records stored in each of the two more data partitions in the subset for user data records based on the unique identifier.

13. The non-transitory computer readable storage medium of claim 12, further comprising:

loading the hierarchical set of bloom filters into a memory of the computer system; and searching the hierarchical set of bloom filters in parallel by one or more processors of the computer system.

14. The non-transitory computer readable storage medium of claim 11, wherein the computer system comprises a plurality of subsystems that are configured to execute one or more jobs that each process and store user data.

15. The non-transitory computer readable storage medium of claim 10, further comprising:

authenticating an identity of the user making the request prior to determining the unique user identifier.

16. The non-transitory computer readable storage medium of claim 10, further comprising:

in response to performing the hard deletion, generating a data deletion results record of the hard deletion comprising at least the unique identifier associated with the user, data indicative of the hard deletion having occurred, and a date when the hard deletion occurred;

in response to receiving a second request from the user computer system for a status of the request, aggregating one or more data deletion results records based on the unique identifier associated with the user; and returning, by the computer system to the user computer system, a report comprising a data deletion summary based on the aggregated one or more data deletion results records.

17. The non-transitory computer readable storage medium of claim 10, wherein the hard data deletion is performed within a predetermined amount of time after receiving the request from the user computer system, the predetermined amount of time comprising a duration of time prescribed by regulation or a duration of time prescribed by a policy of the computer system.

18. A system for hard deletion of user data, comprising:

a memory; and a processor coupled with the memory configured to:

receive a request from a user computer system to delete user data, determine a unique user identifier associated by the system with a user making the request, determine whether a data partition, in which data generated by a job or subsystem of the system is stored, is predicted to contain a record having the unique user identifier by searching a hierarchical set of filters, wherein an upstream job or subsystem associated with a first filter in the hierarchical set of filters feeds data to a downstream job or subsystem associated with a second filter in the hierarchical set of filters, wherein each filter in the hierarchical set of filters is associated with a particular data partition and comprises a data structure that indicates a deterministic prediction of whether a data record associated with a given unique user identifier exists within the particular data partition, wherein the first filter and the second filter are arranged relative to one another in the hierarchical set of filters based on an upstream and a downstream status of jobs or subsystem associated with the first filter or the second filter, and wherein searching the hierarchical set of filters comprises:

searching a first data structure comprised in the first filter to determine whether an upstream data partition of the upstream job or subsystem is predicted to contain the record having the unique user identifier, and when the upstream data partition of the upstream job or subsystem is predicted to contain the record having the unique user identifier, searching a second data structure comprised in the second filter that is downstream of the first filter based on the arrangement of the hierarchical set of filters, to determine whether a downstream data partition of the downstream job or subsystem is predicted to contain the record having the unique user identifier, search, one or more of the upstream data partition and the downstream data partition, when a corresponding data partition is predicted to contain the record having the unique user identifier, data records stored in the corresponding data partition for a user data record based on the unique identifier, and perform a hard deletion of the user data record from the corresponding data partition when found during the searching.

* * * * *